US011825209B2

(12) United States Patent
Osadchiy et al.

(10) Patent No.: US 11,825,209 B2
(45) Date of Patent: Nov. 21, 2023

(54) DATA PRE-PROCESSING FOR CROSS SENSOR AUTOMATIC WHITE BALANCE

(71) Applicant: SAMSUNG ELECTRONICS CO., LTD., Suwon-si (KR)

(72) Inventors: Ilya Osadchiy, Haifa (IL); Doron Sabo, Petah-Tikvah (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/812,829

(22) Filed: Jul. 15, 2022

(65) Prior Publication Data

US 2022/0377297 A1 Nov. 24, 2022

Related U.S. Application Data

(62) Division of application No. 17/089,942, filed on Nov. 5, 2020, now abandoned.

(51) Int. Cl.
*H04N 23/88* (2023.01)
*H04N 9/64* (2023.01)
(Continued)

(52) U.S. Cl.
CPC ............ *H04N 23/00* (2023.01); *G06N 20/00* (2019.01); *G06T 5/009* (2013.01); *G06T 5/50* (2013.01);
(Continued)

(58) Field of Classification Search
CPC ........ H04N 23/88; H04N 9/646; G06N 20/00; G06T 5/009; G06T 5/50;
(Continued)

(56) References Cited

U.S. PATENT DOCUMENTS

2015/0286340 A1 10/2015 Send et al.
2019/0045162 A1 2/2019 Krestyannikov et al.
(Continued)

FOREIGN PATENT DOCUMENTS

DE 102019213184 4/2020

OTHER PUBLICATIONS

Afifi et al., "Sensor-Independent Illumination Estimation for DNN Models", arXiv:1912.06888v1 [cs.CV] Dec. 14, 2019, 13 pages.
Barron, "Convolutional Color Constancy," in Proceedings of the IEEE International Conference on Computer Vision, 2015, pp. 379-387.
(Continued)

*Primary Examiner* — Michael E Teitelbaum
(74) *Attorney, Agent, or Firm* — F. CHAU & ASSOCIATES, LLC

(57) ABSTRACT

Learning-based color correction (e.g., auto while balance (AWB)) procedures may be trained based on datasets from different sensors using a pre-processing procedure. Each input pixel may be converted into a sensor-independent representation through multiplication by a sensor-specific color conversion function (e.g., a 3×3 matrix). The sensor-specific color conversion function may be obtained based on a sensor type. For example, the sensor-specific color conversion function, such as a 3×3 matrix, may be obtained by a corresponding sensor calibration procedure performed using laboratory images of a color checker chart subject to standard illuminants. Parameters of the sensor-specific color conversion function may be optimized in a chromaticity space. For instance, a sensor-specific 3×3 matrix for color conversion may be optimized using a distance in the chromaticity space between calibration data (e.g., calibration configurations) and sensor-independent targets (e.g., a target sensor-independent representation for each calibration configuration).

20 Claims, 9 Drawing Sheets

(51) Int. Cl.
  *G06T 5/00*   (2006.01)
  *G06N 20/00*  (2019.01)
  *G06T 5/50*   (2006.01)
  *H04N 23/00*  (2023.01)

(52) U.S. Cl.
  CPC ... *H04N 9/646* (2013.01); *G06T 2207/10024* (2013.01); *G06T 2207/20081* (2013.01)

(58) Field of Classification Search
  CPC . G06T 2207/10024; G06T 2207/20081; G06T 7/80; G06T 7/90
  See application file for complete search history.

(56) References Cited

U.S. PATENT DOCUMENTS

| | | |
|---|---|---|
| 2021/0058596 A1 | 2/2021 | Afifi et al. |
| 2022/0141438 A1 | 5/2022 | Osadchiy et al. |

OTHER PUBLICATIONS

Barron, et al. "Fast Fourier Color Constancy," in Proceedings of the IEEE Conference on Computer Vision and Pattern Recognition, 2017, pp. 886-894.

Cardei, et al., "Estimating the scene illumination chromaticity by using a neural network", JOSA A, vol. 19, No. 12, pp. 2374-2386, 2002.

Cheng, et al., "Effective Learning-Based Illuminant Estimation Using Simple Features", in Proceedings of the IEEE Conference on Computer Vision and Pattern Recognition, 2015, pp. 1000-1008.

Cheng, et al., "Illuminant Estimation for Color Constancy: Why spatial-domain methods work and the role of the color distribution", JOSA A, vol. 31, No. 6, pp. 1049-1058, 2014.

Gao, et al., "Improving Color Constancy by Discounting the Variation of Camera Spectral Sensitivity," JOSA A, vol. 34, No. 8, pp. 1448-1462, 2017.

Hubel, et al., "Matrix Calculations for Digital Photography," in Color and Imaging Conference, 1997, vol. 1997, pp. 105-111.

Nguyen, et al., "Raw-to-raw: Mapping between image sensor color responses", in Proceedings of the IEEE Conference on Computer Vision and Pattern Recognition, 2014, pp. 3398-3405.

DATA PRE-PROCESSING FOR CROSS SENSOR AUTOMATIC WHITE BALANCE

CROSS-REFERENCE TO RELATED APPLICATION

This application claims priority to, and the benefit of, U.S. application Ser. No. 17/089,942 filed on Nov. 5, 2020, entitled "DATA PRE-PROCESSING FOR CROSS SENSOR AUTOMATIC WHITE BALANCE." The entire contents of the foregoing application are hereby incorporated by reference for all purposes.

BACKGROUND

The following relates generally to image processing, and more specifically to automatic white balancing (AWB).

The use of image capture devices, which may include still image cameras, moving image cameras or other electronic devices that include cameras, has rapidly increased in recent years along with advancements in camera technology. For example, mobile communication terminals, such as cell phones, smart phones, portable computers, tablet computers, and other similar electronic devices may commonly include digital cameras. Additionally, higher quality and less expensive cameras are available to consumers and camera users due to such advancements in camera technology.

Digital cameras allow for a group of settings to be selected or adjusted by a user. For example, a user may select a scene type description or an image capture mode, such as outdoors, indoors, sunny, close-up, candlelight, nighttime, and oilier similar scene type descriptions. Among the group of settings, AWB may be used to determine and/or adjust color temperatures and to determine a temperature of neutral colors, such as a color white. By determining and adjusting the color temperature of white, color temperatures of the remaining colors are also adjusted in order to adjust a color composition of a captured image.

However, estimating the color of the dominant from the raw image captured by the sensor may be difficult. Further, different algorithms and methods may be associated with different performance based on the scene, the lighting, etc.

SUMMARY

A method, apparatus, non-transitory computer readable medium, and system for image processing are described. Embodiments of the method, apparatus, non-transitory computer readable medium, and system are configured to identify image data for an image, wherein the image data comprises a sensor type, generate a sensor-independent representation of the image using a sensor-specific color conversion function corresponding to the sensor type, wherein parameters of the sensor-specific color conversion function have been optimized in a chromaticity space, and produce a sensor-independent illuminance estimate for the image based on the sensor-independent representation.

A method, apparatus, non-transitory computer readable medium, and system for image processing are described. Embodiments of the method, apparatus, non-transitory computer readable medium, and system are configured to determine a target sensor-independent representation for each of a plurality of calibration configurations by optimizing in a chromaticity space, determine a sensor-specific color conversion function for each of a plurality of sensor types by optimizing in the chromaticity space based on the target sensor-independent representation for each of the plurality of calibration configurations, and perform white balancing for an image captured with a sensor type from the plurality of sensor types based on the corresponding sensor-specific color conversion function.

An apparatus, system, and method for image processing are described. Embodiments of the apparatus, system, and method are configured to a sensor configured to capture image data, wherein the sensor has a spectral sensitivity corresponding to a sensor type, a pre-processing component configured to generate a sensor-independent representation of the image using a sensor-specific color conversion function corresponding to the sensor type, wherein parameters of the sensor-specific color conversion function have been optimized in a chromaticity space, an illuminance estimation component configured to produce a sensor-independent illuminance estimate based on the sensor-independent representation, and a post-processing component configured to generate a sensor-specific illuminance estimate based on the sensor-independent illuminance estimate using an inverse of the sensor-specific color conversion function.

DETAILED DESCRIPTION

Figure 1:
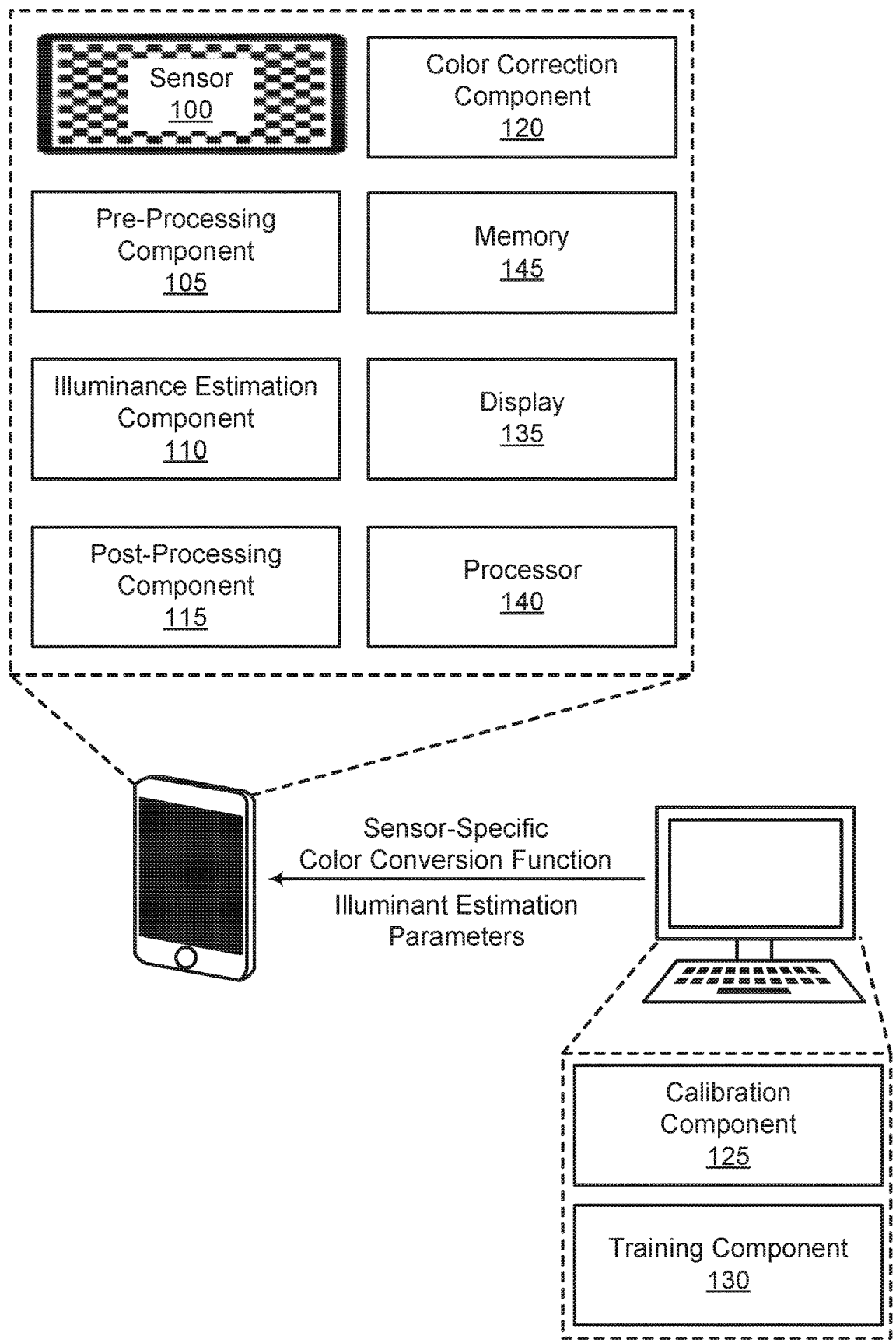
FIG. 1 shows an example of a system for color correction according to aspects of the present disclosure.

Color Constancy and automatic white balance (AWB) are methods in digital photography used to correct rendering of colors. A white balance (or color balance) may refer to the adjustment of the intensity of various colors in an image (typically red, green, and blue primary colors). This may enable the detection of colors in a way that seems more accurate to an average observer. In many cases, the colors will be balanced so that white objects appear white. For example, this may mean adjusting the red-green-blue (RGB) values of pixels depicting a white or gray object so that these values are equal. Hence, color balancing methods may be called gray balance, neutral balance, or white balance. The color captured by a camera is affected by surface reflectance and by the spectrum of light, which illuminates the surface.

A white balance (or color balance) may refer to the adjustment of the intensity of various colors in an image (typically red, green, and blue primary colors), This may enable the detection of colors in a way that seems more accurate to an average observer. In many cases, the colors will be balanced so that white objects appear white. For example, this may mean adjusting the RGB values of pixels depicting a white or gray object so that these values are equal. Hence, color balancing methods may be called gray balance, neutral balance, or white balance.

In order to perform an AWB operation, a variety of algorithms and methods may be used by cameras, such as illumination estimation, a Bayesian method, Retinex models, Von Kries' method, a Grey World assumption method or other similar algorithms and methods. An AWB operation estimates or determines color temperatures according to assumptions and data or statistics corresponding to sensor data. For example, the gray world assumption method assumes that the color in each sensor channel averages to gray over the entire image and adjusts the color of white according to the assumption. In some cases, a simplified image formation model may approximate the effect of illumination as the scaling of intensity by a factor per color channel.

Accordingly, image data acquired by sensors, either film or electronic image sensors, may be transformed from the acquired values to new values that are appropriate for color reproduction or display. Several aspects of the acquisition and display process make such color correction desirable (e.g., including that the acquisition sensors do not match the sensors in the human eye, that the properties of the display medium may be accounted for, and that the ambient viewing conditions of the acquisition differ from the display viewing conditions).

Statistical methods such as Grey World algorithms and learning-based methods may estimate the color of the dominant illumination from the raw image captured by the sensor. The learning-based methods provide results on academic datasets. However, a standard supervised learning setting assumes the training and testing examples come from one sensor. The assumption limits the applicability of such algorithms because the algorithms collect large and diverse training sets for each inference sensor. The process may be expensive and time-consuming. Additionally or alternatively, the algorithm may be based on the quality of the data collected for each sensor and the successful reproduction of the training procedure. In particular applications, a standard supervised learning setting may be impractical, where exotic color filter array (CFA) types may be used, such as Red-Clear-Clear-Green (RCCG), Red-Clear-Clear-Blue (RCCB), etc., resulting in a specific solution for each sensor.

The present disclosure generally relates to computational photography, computer vision, and image processing. Specifically, embodiments of the present disclosure relate to a method for pre-processing raw image data originating from different camera sensors to provide the ability to apply sensor-specific AWB algorithms for a wide range of sensor types. For instance, the techniques described herein may use data (e.g., image data) from multiple sensors for training learning-based color correction methods and may provide a way to perform inference on sensors (e.g., on types of sensors) not present in the training set (e.g., without retraining). A commonly used simplified image formation model approximates the effect of illumination as the scaling of intensity by a factor per color channel. Estimating the color of the dominant illumination from the raw image captured by the sensor may be difficult. Embodiments of the present disclosure eliminate the influence of the light color.

According to the techniques described herein, single-sensor color constancy algorithms may be applied to sensors that may or may not be present in the training set (e.g., to sensors that may or may not have been used to capture input images of the training set). For instance, learning-based color correction (e.g., AWB) approaches may be trained based on datasets from different sensors using a pre-processing procedure. Each input pixel may be converted into a sensor-independent representation through multiplication by a sensor-specific color conversion function (e.g., a 3×3 matrix). The sensor-specific color conversion function (e.g., the 3×3 matrix) may be obtained based on a sensor type. For example, the sensor-specific color conversion function, such as a 3×3 matrix, may be obtained by a corresponding sensor calibration procedure performed using laboratory images of a color checker chart subject to standard illuminants. Such data may be collected as part of a sensor calibration process. Accordingly, the sensor-specific color conversion function may be determined offline (e.g., once per sensor). A color constancy algorithm may receive a chromaticity input. The luminosity of a pixel may be discarded, and 2 chromaticity channels may be used instead of 3 color channels. Parameters of the sensor-specific color conversion function may be optimized in a chromaticity space. For instance, a sensor-specific 3×3 matrix for color conversion may be optimized using a distance in the chromaticity space between calibration data (e.g., calibration configurations) and sensor-independent targets (e.g., a target sensor-independent representation for each calibration configuration). The present disclosure also describes a process to obtain such a sensor-independent target based on the calibration data of the sensors.

FIG. 1 shows an example of a system for color correction according to aspects of the present disclosure. The example shown includes sensor 100, pre-processing component 105, illuminance estimation component 110, post-processing component 115, color correction component 120, calibration component 125, training component 130, display 135, processor 140, and memory 145. In some examples, one or more aspects of the example system of FIG. may be a part of a device such as a camera, a mobile electronic device, a vehicle, etc. For instance, the system may be implemented in an image signal processor (ISP) component of a system on chip (SoC) designated for an automobile. Moreover, in some examples, one or more aspects of the example system of FIG. 1 may be a part of a device such as a personal computer (PC), laptop computer, mainframe computer, palmtop computer, personal assistant, mobile device, or any other suitable processing apparatus. However, the present disclosure is not limited to such devices or such system configurations. For example, in some cases, image data may be received from remote sensors and processed on the cloud.

A system for color correction may collect light data in an image capturing process (e.g., via sensor 100), where the light data is reflected and refracted from surfaces of various objects in a scene. For example, the objects may be structured, natural, or artificial objects such as buildings, cars, people, animals, and the like. Additionally, objects may be amorphous subjects such as sky, grass, and oceans, but the present disclosure is not limited to these examples.

The apparent color of captured objects in an image may depend on the original colors of the objects and the illumination conditions of the scene. That is, the light absorption and emission spectra of objects may determine the perceived color together with the illumination conditions and the structure of the human visual system. For example, an image of a scene in daylight illumination conditions may appear different compared to the same scene during sunset or dawn. The difference in temperature of illuminants causes this difference. Colder color temperatures may be visible in the middle of the day, and warmer color temperatures may be visible during sunset.

The color temperature of a light source refers to the temperature of an ideal black-body radiator that radiates light of that color. Thus, color temperature is meaningful for light sources that correspond closely to the radiation of a particular black body. This may include light in the range from red to orange to yellow to white to blueish white. Color temperature may not apply to green or a purple light. Color temperature is conventionally expressed in kelvins, using the symbol K, a unit of measure for absolute temperature. For example, color temperatures over 5000 K are sometimes referred to as "cool colors" (bluish), while lower color temperatures (2700-3000 K) may be referred to as "warm colors" (yellowish).

As described in more detail herein, the present disclosure provides a process to use a single-sensor color constancy algorithm in multi-sensor scenarios. Embodiments of the present disclosure provide a process to use data from multiple sensors for training and provide a process to perform inference on sensors not present in the training set without retraining. Additionally or alternatively, embodiments of the present disclosure result in low computational cost using pre-processing. The corresponding calibration procedure of the present disclosure uses obtainable data, and re-designing and re-implementing a color constancy algorithm may not be performed.

A processor 140 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 140 is configured to operate a memory array using a memory controller. In other cases, a memory controller is integrated into the processor 140. In some cases, the processor 140 is configured to execute computer-readable instructions stored in a memory 145 to perform various functions. In some embodiments, a processor 140 includes special purpose components for modem processing, baseband processing, digital signal processing, or transmission processing.

Software may include code to implement aspects of the present disclosure. Software may be stored in a non-transitory computer-readable medium such as system memory 145 or other memory 145. In some cases, the software may not be directly executable by the processor 140 but may cause a computer (e.g., when compiled and executed) to perform functions described herein.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances, in other words, the learning algorithm generalizes from the training data to unseen examples.

Examples of memory 145 include random access memory (RAM), read-only memory (ROM), or a hard disk. Examples of memory 145 include solid state memory 145 and a hard disk drive. In some examples, memory 145 is used to store computer-readable, computer-executable software including instructions that, when executed, cause a processor 140 to perform various functions described herein. In some cases, the memory 145 contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory 145 store information in the form of a logical state.

According to some embodiments, sensor 100 captures the image using a sensor 100 corresponding to the sensor type. According to some embodiments, sensor 100 be configured to capture image data, wherein the sensor 100 has a spectral sensitivity corresponding to a sensor type.

According to some embodiments, pre-processing component 105 identifies image data for an image, where the image data includes a sensor type. In some examples, pre-processing component 105 generates a sensor-independent representation of the image using a sensor-specific color conversion function corresponding to the sensor type, where parameters of the sensor-specific color conversion function have been optimized in a chromaticity space. In some examples, pre-processing component 105 determines a spectral sensitivity of the sensor 100. In some examples, pre-processing component 105 determines the sensor type based on the spectral sensitivity. In some examples, the image data includes a 3-channel image vector, and the sensor-specific color conversion function includes a 3×3 matrix. In some examples, the process of optimizing the sensor-specific color conversion function is performed offline once per sensor (e.g., via calibration component 125 on a PC of a user that performs calibrations of sensor+ISP).

According to some embodiments, pre-processing component 105 identities image data including a 3-channel image vector, where each of the sensor-specific color conversion functions includes a 3×3 matrix. In some examples, pre-processing component 105 performs pre-processing on the image using the sensor-specific color conversion function to produce a sensor-independent representation of the image. In some examples, pre-processing component 105 applies the sensor-specific color conversion function for the input sensor type to each of the input images to produce a sensor-independent representation for an input image of the set of input images. In some examples, pre-processing component 105 applies the sensor-specific color conversion function for the input sensor type to the ground truth illuminance to produce a sensor-independent illuminance. According to some embodiments, pre-processing component 105 comprise a pre-processing component configured to generate a sensor-independent representation of the image using a sensor-specific color conversion function corresponding to the sensor type, where parameters of the sensor-specific color conversion function have been optimized in a chromaticity space. Pre-processing component 105 is an example of, or includes aspects of, the corresponding element described with reference to FIGS. 2 and 3.

According to some embodiments, illuminance estimation component 110 produces a sensor-independent illuminance estimate for the image based on the sensor-independent representation. According to some embodiments, illuminance estimation component 110 generates a sensor-independent illuminance estimate based on the sensor-independent representation of the image. In some examples, illuminance estimation component 110 applies the illuminance estimation model to generate a sensor-independent illuminance estimate for the input image, According to some embodiments, illuminance estimation component 110 be configured to produce a sensor-independent illuminance estimate based on the sensor-independent representation. Illuminance estimation component 110 is an example of, or includes aspects of, the corresponding element described with reference to FIGS. 2 and 3.

According to some embodiments, post-processing component 115 applies an inverse of the sensor-specific color conversion function to the sensor-independent illuminance estimate to produce a sensor-specific illuminance estimate. According to some embodiments, post-processing component 115 performs post-processing on the sensor-independent illuminance estimate using an inverse of the sensor-specific color conversion function, where the white balancing is performed based on the post-processing. According to some embodiments, post-processing component 115 be configured to generate a sensor-specific illuminance estimate based on the sensor-independent illuminance estimate using an inverse of the sensor-specific color conversion function. Post-processing component 115 is an example of, or includes aspects of, the corresponding element described with reference to FIG. 2.

According to some embodiments, color correction component 120 performs color correction on the image based on the sensor-specific illuminance estimate. In some examples, color correction component 1:20 determines the sensor-specific color conversion function for the sensor type based on the target sensor-independent representation for each of the set of calibration configurations. According to some embodiments, color correction component 120 performs white balancing for an image captured with a sensor type from the set of sensor types based on the corresponding sensor-specific color conversion function. According to some embodiments, color correction component 120 be configured to perform color correction on the image based on the sensor-specific illuminance estimate.

According to some embodiments, a sensor-specific color conversion function may be determined offline (e.g., by another device such as a PC) and the sensor-specific color conversion function may be passed to the color correction component 120. For instance, calibration component 125 may determine the sensor-specific color conversion function by optimizing in the chromaticity space. In some examples, calibration component 125 may determine color conversion functions once per sensor (e.g., calibration component 125 may determine a sensor-specific color conversion function once for each sensor type). In some cases, the color correction component 120 may then determine the target sensor-independent representation by applying the sensor-specific conversion function determined by the calibration component 125.

According to some embodiments, calibration component 125 determines a target sensor-independent representation for each of a set of calibration configurations by optimizing in the chromaticity space. According to some embodiments, calibration component 125 determines a target sensor-independent representation for each of a set of calibration configurations by optimizing in a chromaticity space. In some examples, calibration component 125 determines a sensor-specific color conversion function for each of a set of sensor types by optimizing in the chromaticity space based on the target sensor-independent representation for each of the set of calibration configurations. In some examples, calibration component 125 identifies a set of configuration images, where each of the set of configuration images includes a configuration sensor type from the set of sensor types and a calibration configuration from the set of calibration configurations.

In some examples, calibration component 125 iterates between a first step and a second step to produce a reverse color conversion function for each of the set of sensor types and a target sensor-independent representation for each of the set of calibration configurations, where the first step optimizes the reverse color conversion function to minimize a first distance in the chromaticity space between each of a set of calibration images and a product of the reverse color conversion function and a previous iteration of the target sensor-independent representation, where the first distance is aggregated across all of the calibration configurations and the first optimization is performed for each of the set of sensor types independently; and where the second step optimizes target sensor-independent representation to minimize a second distance in the chromaticity space between each of the set of calibration images and a product the optimized reverse color conversion function from the first step and target sensor-independent representation, where the second distance is aggregated across all of the plurality of sensor types and is performed for each of the set of calibration configurations independently.

In some examples, calibration component 125 initializes the target sensor-independent representation for each of the set of calibration configurations based on a reference illuminance. In some examples, calibration component 125 minimizes a distance between a chromaticity-space representation of a product of a color conversion function and a set of calibration images corresponding to the corresponding sensor type and the set of calibration configurations to a chromaticity space representation of each of the set of calibration configurations, where the target sensor-independent representation for each of the set of calibration configurations is based on the minimizing. In some examples, each of the set of calibration configurations includes a reflectance and an illuminance. In some examples, the set of calibration configurations represents an evenly spaced covering of a color space. According to some embodiments, calibration component 125 be configured to optimize the parameters of the sensor-specific color conversion function in the chromaticity space.

According to some embodiments, training component 130 identifies training data for an illuminance estimation model, where the training data includes a set of input images, and where each of the input images is associated with an input sensor type and a ground truth illuminance. In some examples, training component 130 compares the sensor-independent illuminance estimate to the sensor-independent illuminance. In some examples, training component 130 updates the illuminance estimation model based on the comparison, where the white balancing is performed based on the illuminance estimation model.

According to some embodiments, display 135 displays a white-balanced version of the image to a user based on the color correction (e.g., display 135 displays a version of the image with AWB). According to some embodiments, display 135 be configured to display 135 the image to a user based on the color correction.

Figure 2:
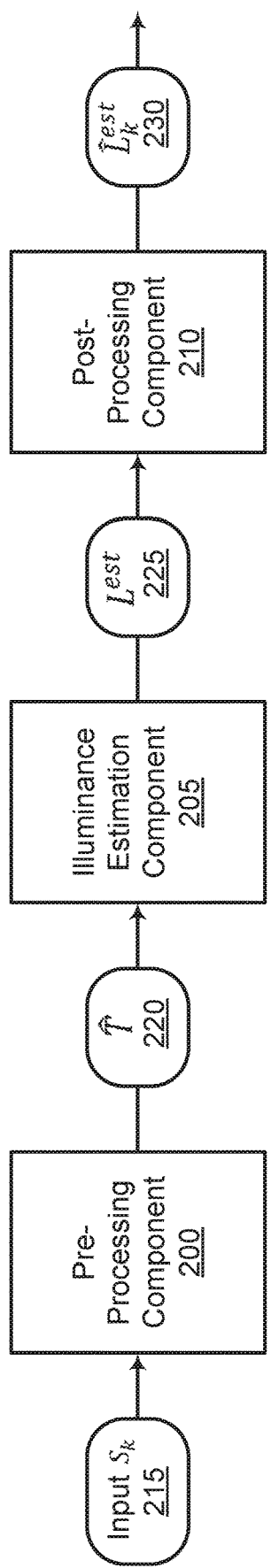
FIG. 2 shows an example of a color correction process according to aspects of the present disclosure.

FIG. 2 shows an example of a color correction process according to aspects of the present disclosure. The example shown includes pre-processing component 200, illuminance estimation component 205, post-processing component 210, input image 215, sensor-independent representation 220, sensor-independent illuminance estimate 225, and sensor-specific illuminance estimate 230. For instance, according to the techniques described herein, a color correction process may be performed such that pre-processing component 200, illuminance estimation component 205, and post-processing component 210 may process an input image 215 (e.g., input $S_k$) and calculate a sensor-specific illuminance estimate 230 (e.g., $\hat{L}_k^{est}$). In some cases, the sensor-specific illuminance estimate 230 (e.g., $\hat{L}_k^{est}$) may be used, for example, for AWB.

Embodiments of the present disclosure may use a sensor-specific color conversion function including a 3×3 matrix (e.g., $M_k$), but the disclosure is not limited to such a 3×3 matrix and larger or smaller matrices may be used by analogy without departing from the scope of the present disclosure. Conversion to sensor-independent space may be performed by multiplying each pixel in sensor-specific space by the matrix. The original sensor space is not limited to a RGB space but can be of any other 3-channel space like RCCG or RCCB. A matrix can be calculated for each sensor using the calibration data.

For example, an input image 215 (e.g., input $S_k$) may include an input image from a sensor k. A pre-processing component 200 may multiply the input image 215 by a sensor-specific color conversion function $M_k$ (e.g., where $M_k$ is a color conversion function specific to the sensor k uses for input image $S_k$). The input image 215 may thus be translated to another color space as a sensor-independent representation 220 (e.g., T). Illuminance estimation component 205 may then calculate chromaticity from the sensor-independent representation 220 ($\hat{T}$) (e.g., where the chromaticity calculation may be a part of a single-sensor white balance algorithm). Such may produce some sensor-independent illuminance estimate 225 ($L^{est}$). A post-processing component 210 may then multiply the sensor-independent illuminance estimate 225 ($L^{est}$) by the inverse of the sensor-specific color conversion function (e.g., $M_k^{-1}$) to produce estimated light in the original color space of the sensor (e.g., to produce sensor-specific illuminance estimate 230, $\hat{L}_k^{est}$).

Pre-processing component 200 is an example of, or includes aspects of, the corresponding element described with reference to FIGS. 1 and 3, Illuminance estimation component 205 is an example of, or includes aspects of, the corresponding element described with reference to FIGS. 1 and 3. Post-processing component 210 is an example of, or includes aspects of, the corresponding element described with reference to FIG. 1. Input image 215 is an example of, or includes aspects of, the corresponding element described with reference to FIG. 3. Sensor-independent representation 220 is an example of, or includes aspects of, the corresponding element described with reference to FIG. 3. Sensor-independent illuminance estimate 225 is an example of, or includes aspects of, the corresponding element described with reference to FIG. 3.

Figure 3:
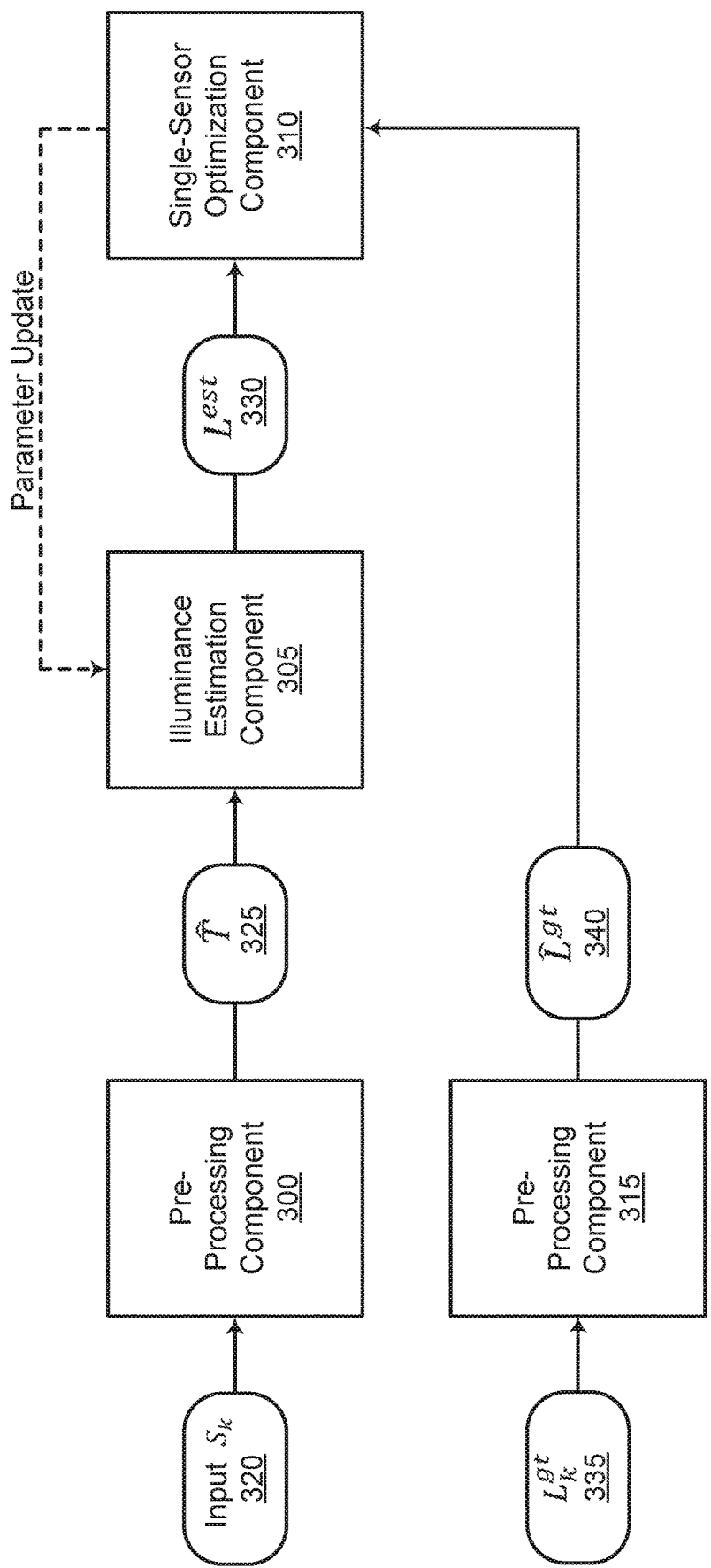
FIG. 3 shows an example of a calibration process according to aspects of the present disclosure.

FIG. 3 shows an example of a training process (e.g., a process for training of an underlying single-sensor AWB algorithm) according to aspects of the present disclosure. The example shown includes pre-processing component 300, illuminance estimation component 305, single-sensor optimization component 310, pre-processing component 315, input image 320, sensor-independent representation 325, sensor-independent illuminance estimate 330, ground truth illuminance 335, and sensor-independent illuminance 340.

For example (e.g., in a supervised training setting), the parameters of the algorithms may be trained with pairs of input images 320 and ground-truth illuminants (e.g., ground truth illuminance 335). At an inference time, the original single-sensor algorithm (e.g., illuminance estimation component 305) produces an illuminant estimation (e.g., sensor-independent illuminance estimate 330, $L^{est}$) as an RGB color, when provided with an RGB input image. The RGB input image is converted to chromaticity in a first stage. During the training of each sample from sensor k the input picture $S_k$ is transformed to obtain a sensor-independent representation 325 ($\hat{T}$). Additionally or alternatively, the provided ground truth illuminance 335 ($L_k^{gt}$) may be trans-formed to obtain sensor-independent illuminance 340 ($\hat{L}^{gt}$) Therefore, training data may be gathered from multiple sensors, with the data converted to the sensor-independent space (e.g., $S_k$ may be converted to $\hat{T}$ and $L_k^{gt}$ may be converted to $\hat{L}^{gt}$, respectively). At the inference time, the input may be transformed the same way and the output sensor-independent illuminance estimate 330 ($L^{est}$) may be then translated to illuminant in sensor-specific space $\hat{L}_k^{est}$ using the inverse matrix (e.g., as described in more detail herein, for example, with reference to FIG. 2). As an example, pre-processing component 300 may perform aspects of example Equation (1), pre-processing component 315 may perform aspects of example Equation (2), and post-processing component 210 may perform aspects of example Equation (3), where:

$$\hat{T} = M \cdot S_k \qquad (1)$$

$$\hat{L}^{gt} = M \cdot L_k^{gt} \qquad (2)$$

$$\hat{L}_k^{est} = M^{-1} \cdot L^{est} \qquad (3)$$

Pre-processing component 300 and pre-processing component 315 may be examples of, or include aspects of, the corresponding element described with reference to FIGS. 1 and 2. Illuminance estimation component 305 is an example of, or includes aspects of, the corresponding element described with reference to FIGS. 1 and 2. Input image 320 is an example of, or includes aspects of, the corresponding element described with reference to FIG. 2. Sensor-independent representation 325 is an example of, or includes aspects of, the corresponding element described with reference to FIG. 2. Sensor-independent illuminance estimate 330 is an example of, or includes aspects of, the corresponding element described with reference to FIG. 2.

Figure 4:
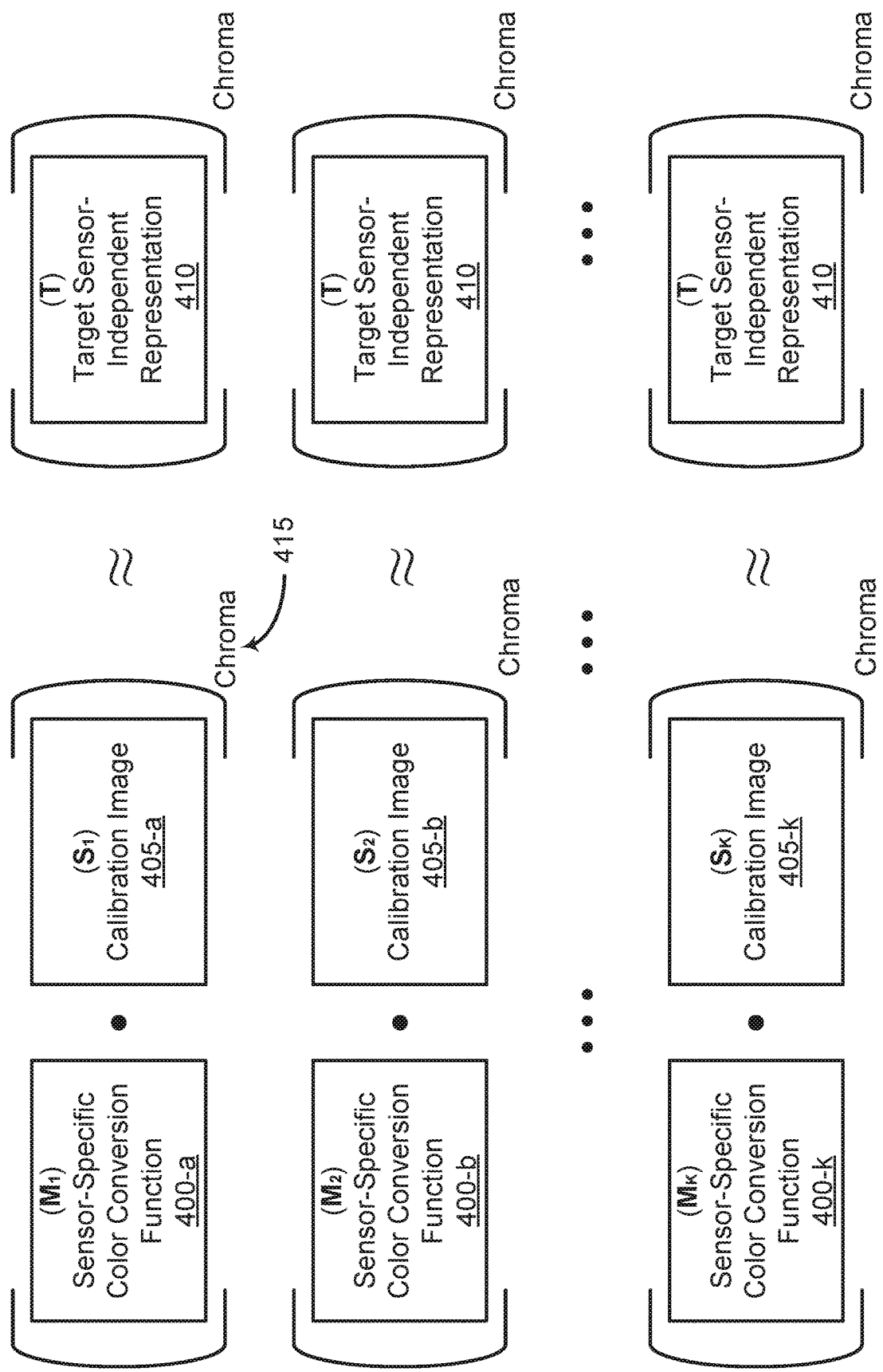
FIGS. 4 through 5 show examples of an optimization process according to aspects of the present disclosure.

FIG. 4 shows an example of an optimization process according to aspects of the present disclosure. The example shown includes sensor-specific color conversion function 400, calibration image 405, target sensor-independent representation 410, and chromaticity function 415.

In the calibration process, embodiments of the present disclosure collect data to provide different reflectances under different illuminants based on a given sensor. Then, the data may be compared to a reference target to optimize the matrix. Pictures are taken of color checker chart (e.g., Macbeth ColorChecker has 24 patches with predefined reflectances) under several standard illuminants (i.e. light sources with predefined spectrum) in a controlled laboratory environment. A procedure may be performed as part of standard sensor calibration or color accuracy test and may be performed by creators of color constancy datasets. For example, a dataset (e.g., a National University of Singapore (NUS) dataset) may provide calibration pictures of 24 patches under 6 illuminants, with 144 RGB points for optimization.

As an example, a calibration process may include capturing images of a chart with 24 reflectances (patches) under 6 illuminants, with each of 8 sensors. Each of such images may have many pixels. However, instead of using individual pixels, color of each patch may be retrieved. Retrieved color of each patch may then be compared between different sensors (e.g., as pixels across sensors may have different resolutions, distortions, etc.). In a first step, optimization may be performed independently for each sensor (e.g., out of 8), aggregating over all reflectance-illuminant combinations (e.g., 24*6). In a second step, optimization may be performed independently for each reflectance-illuminant combination (e.g., 24*6), aggregating over all sensors (e.g., 8).

However, the techniques described herein are not d to specific illuminants. For example, the present disclosure may implement illuminants that may be evenly spaced over the range of color temperatures and cover the space of relevant illumination colors.

Many color constancy algorithms perform some pre-processing of the input (e.g., such as converting to rg-chromaticity space, or log-chroma space, or the like). Therefore, the sensor-independent representation may provide relevant results in an appropriate space. The aforementioned spaces may discard luminosity. Therefore, the spaces may not adjust the brightness of illuminants used for data collection.

The calibration data (e.g., calibration images 405 $\{S_1, S_2, \ldots S_k\}$) of a sensor k may be denoted with $S_k \in \mathbb{R}^{3 \times N}$ and the sensor independent target (e.g., the target sensor-independent representation 410) may be denoted with $T \in \mathbb{R}^{3 \times N}$. Both are given as RGB value for each of N patches, where N is number of calibration illuminants times number of reflectances (i.e. patches in the chart). The chromaticity function 415 may be denoted with chroma: $\mathbb{R}^3 \to \mathbb{R}^2$. The same chromaticity notation may be used for a function applied for each patch (i.e. column-wise) of the data.

The sensor matrix $M_k^*$, may be determined and used for optimization. For the optimization, embodiments of the present disclosure may use a distance in chroma of sensor-independent space over patches and illuminants (e.g., the sum of squared errors may be used). Scaling RGB values by a constant does may not affect chromaticity. Therefore, the scale of M may be arbitrary and may be removed, as a redundant degree of freedom, by adding a linear constraint (e.g., the sum of elements in M or the trace of M). Additionally or alternatively, the chromaticity may not be defined for negative values from matrix multiplication. In this case, the distance may be substituted with a penalty on the negative value. The resulting optimization formulation may not be linear. The optimization formulation may be solved numerically using an iterative method. The initialization of the matrix before the optimization may be, for example, a least-squares solution in RGB space.

An example of an optimization with a sum of squared error as a distance and a sum of elements as a constraint is shown in Eq. 4.

$$M_k^* = \underset{M}{\mathrm{argmin}} \|\mathrm{chroma}(M \cdot S_k) - \mathrm{chroma}(T)\|^2 \quad (4)$$
$$\text{s.t. } e^T M e = 3$$

Calibration image 405 is an example of, or includes aspects of, the corresponding element described with reference to FIG. 5. Target sensor-independent representation 410 is an example of, or includes aspects of, the corresponding element described with reference to FIG. 5, Chromaticity function 415 is an example of, or includes aspects of, the corresponding element described with reference to FIG. 5.

Figure 5:
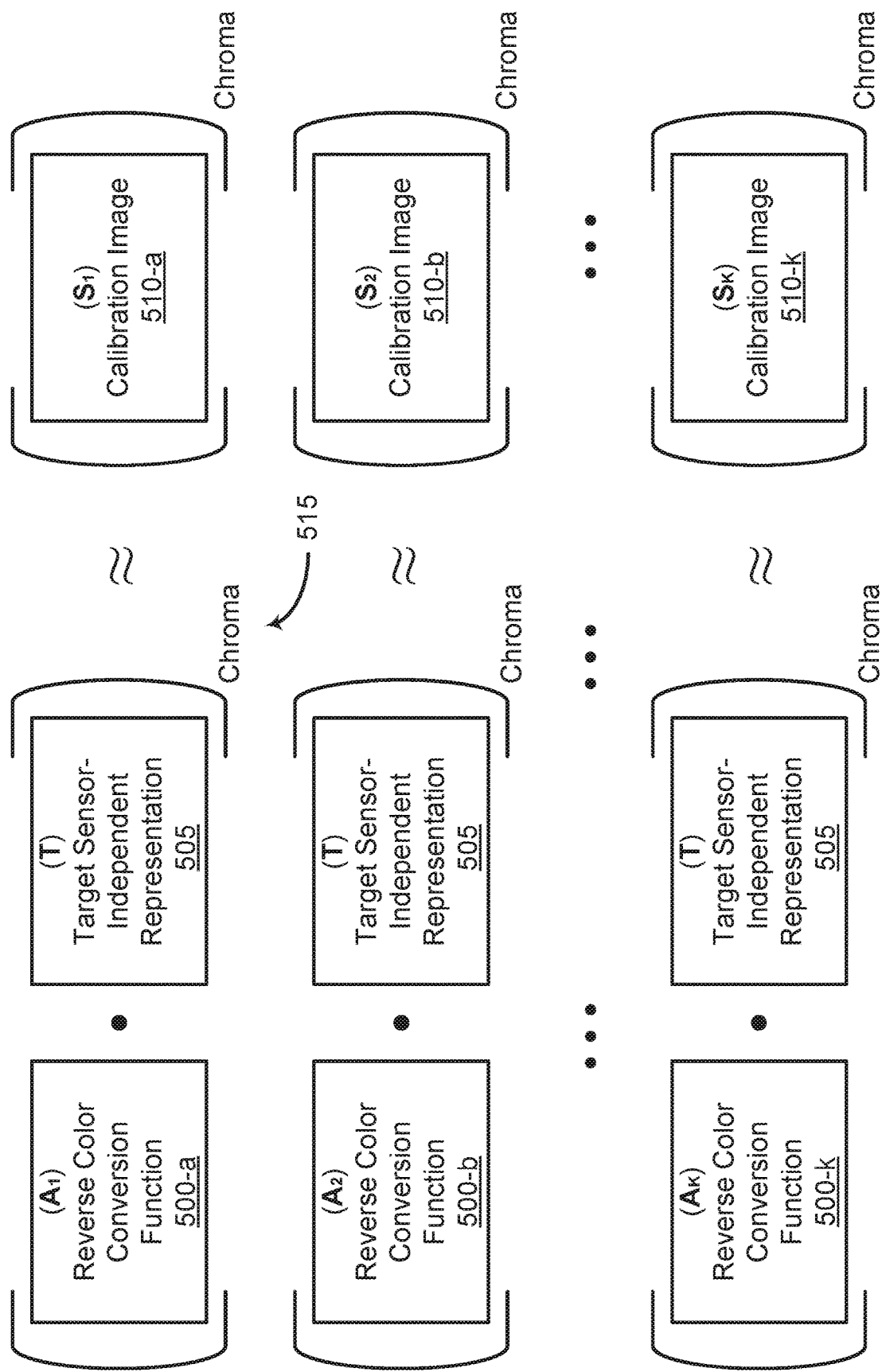

FIG. 5 shows an example of an optimization process according to aspects of the present disclosure. The example shown includes reverse color conversion function 500, target sensor-independent representation 505, calibration image 510, and chromaticity function 515.

The optimization uses a target representation (e.g., target sensor-independent representation 505) of the color checker patches under relevant illuminants (T). If there are multiple training sensors, embodiments of the present disclosure search for a target to minimize the error of inverse transformation (e.g., from sensor-independent to sensor-specific space). Additionally or alternatively, the target sensor-independent representation 505 (T) and the inverse transform matrices (e.g., the reverse color conversion functions 500 $\{A_1, A_2 \ldots A_k\}$) may be optimized for each sensor k. The sum of squared errors in chroma of the sensor specific space is minimized. Embodiments of the present disclosure may use a transformation from sensor-independent representation for results close to the sensor data if a target with low error for sensors in sensor-independent space is used, leading to a degenerated target and matrices (e.g., transforming the colors into grey). Additionally or alternatively, the found target RGB values may be positive, with a margin from zero. The luminosity of the target may be constrained and may not be used for the chromaticity.

The target sensor-independent representation 505 (T) may be initialized to reference colors of the reflectances under one standard illuminant (e.g., D65) for the different illuminants used in calibration data (e.g., calibration images 510 $\{S_1, S_2, \ldots S_k\}$) The matrices (e.g., the reverse color conversion functions 500 $\{A_1, A_2 \ldots A_k\}$) may be initialized to RGB least-squares solutions. The matrices (e.g., the reverse color conversion functions 500 $\{A_1, A_2 \ldots A_k\}$) and the target sensor-independent representation 505 (T) may then be iterated in an alternating sequence. Then the matrices (e.g., the reverse color conversion functions 500 $\{A_1, A_2, \ldots A_k\}$) and the target sensor-independent representation 505 (T) are optimized based on the iterations. During the reverse color conversion function 500 optimization step, the reverse color conversion functions 500 are optimized for each sensor k separately, using the patches and illuminants. During the target optimization (e.g., optimization of target sensor-independent representation 505), the RGB value is optimized separately for each patch and illuminant, using the reverse color conversion functions 500 and per-sensor values of the same patch. Equation 5 and Equation 6 show alternating example optimization equations:

$$A_{k,i}^* = \underset{A}{\mathrm{argmin}} \sum_j \|\mathrm{chroma}(S_{k,j}) - \mathrm{chroma}(A \cdot T_{j,i-1}^*)\|^2, \forall k \text{ s.t. } e^T A e = 3 \quad (5)$$

$$T_{j,i}^* = \underset{T_j}{\mathrm{argmin}} \sum_k \|\mathrm{chroma}(S_{k,j}) - \mathrm{chroma}(A_{k,i}^* \cdot T_j)\|^2, \forall j \text{ s.t. } e^T T_j = 1 \; T_j > \epsilon \quad (6)$$

Where i denotes the iteration index, k is the sensor index, and j is the index of the patch and illuminant in the calibration data and target. After the target sensor-independent representation 505 (T) is obtained, the forward transformation matrices may be found. Additionally, for the training sensors, an inverse of the inverse transformation matrix may be used as an initialization.

Target sensor-independent representation 505 is an example of, or includes aspects of, the corresponding element described with reference to FIG. 4. Calibration image 510 is an example of, or includes aspects of, the corresponding element described with reference to FIG. 4. Chromaticity function 515 is an example of, or includes aspects of, the corresponding element described with reference to FIG. 4.

Figure 6:
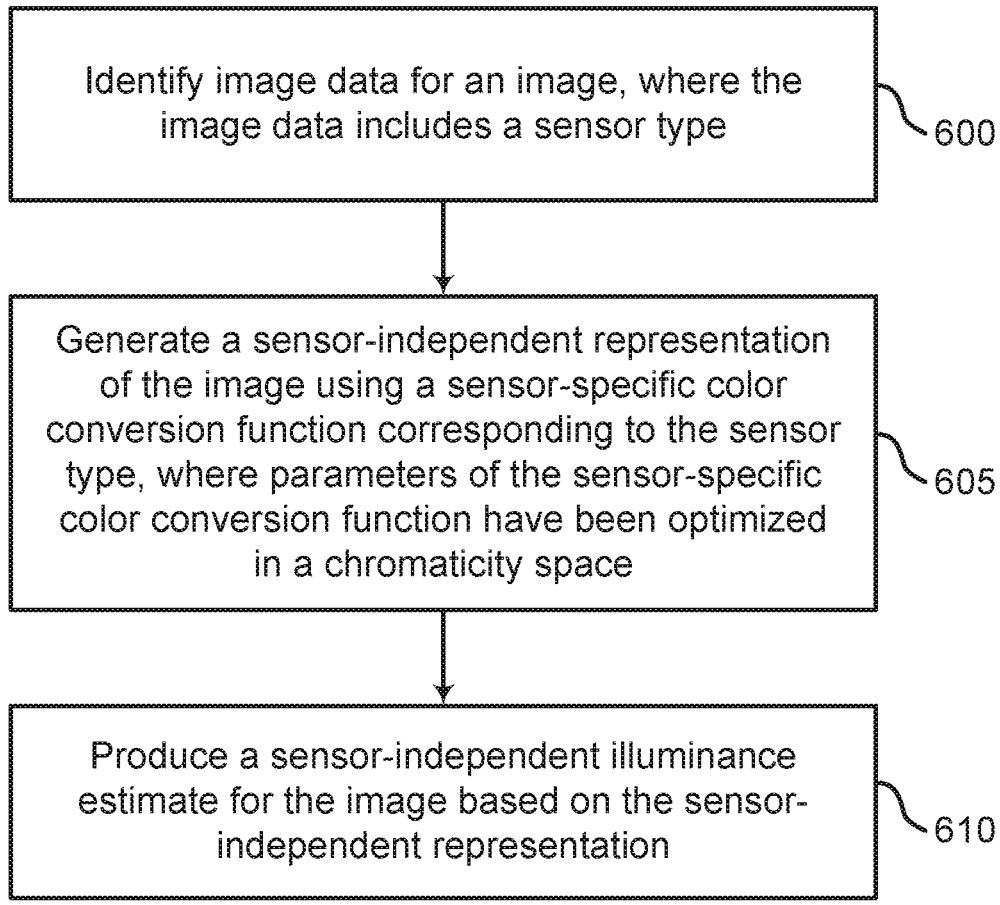
FIGS. 6 through 9 show examples of a process for image processing according to aspects of the present disclosure.

FIG. 6 shows an example of a process for image processing according to aspects of the present disclosure. In some examples, these operations are performed by a system including a processor executing a set of codes to control functional elements of an apparatus. Additionally or alternatively, certain processes are performed using special-purpose hardware, Generally, these operations are performed according to the methods and processes described in accordance with aspects of the present disclosure. In some cases, the operations described herein are composed of various substeps, or are performed in conjunction with other operations.

At operation 600, the system identifies image data for an image, where the image data includes a sensor type. In some cases, the operations of this step refer to, or may be performed by, a pre-processing component as described with reference to FIGS. 1-3.

At operation 605, the system generates a sensor-independent representation of the image using a sensor-specific color conversion function corresponding to the sensor type, where parameters of the sensor-specific color conversion function have been optimized in a chromaticity space. For instance, parameters of the sensor-specific color conversion function may be optimized in a chromaticity space offline (e.g., in an operation prior to operation 600). In some cases, the operations of this step refer to, or may be performed by, a pre-processing component as described with reference to FIGS. 1-3.

At operation 610, the system produces a sensor-independent illuminance estimate for the image based on the sensor-independent representation. In some cases, the operations of this step refer to, or may be performed by, an illuminance estimation component as described with reference to FIGS. 1-3.

Figure 7:
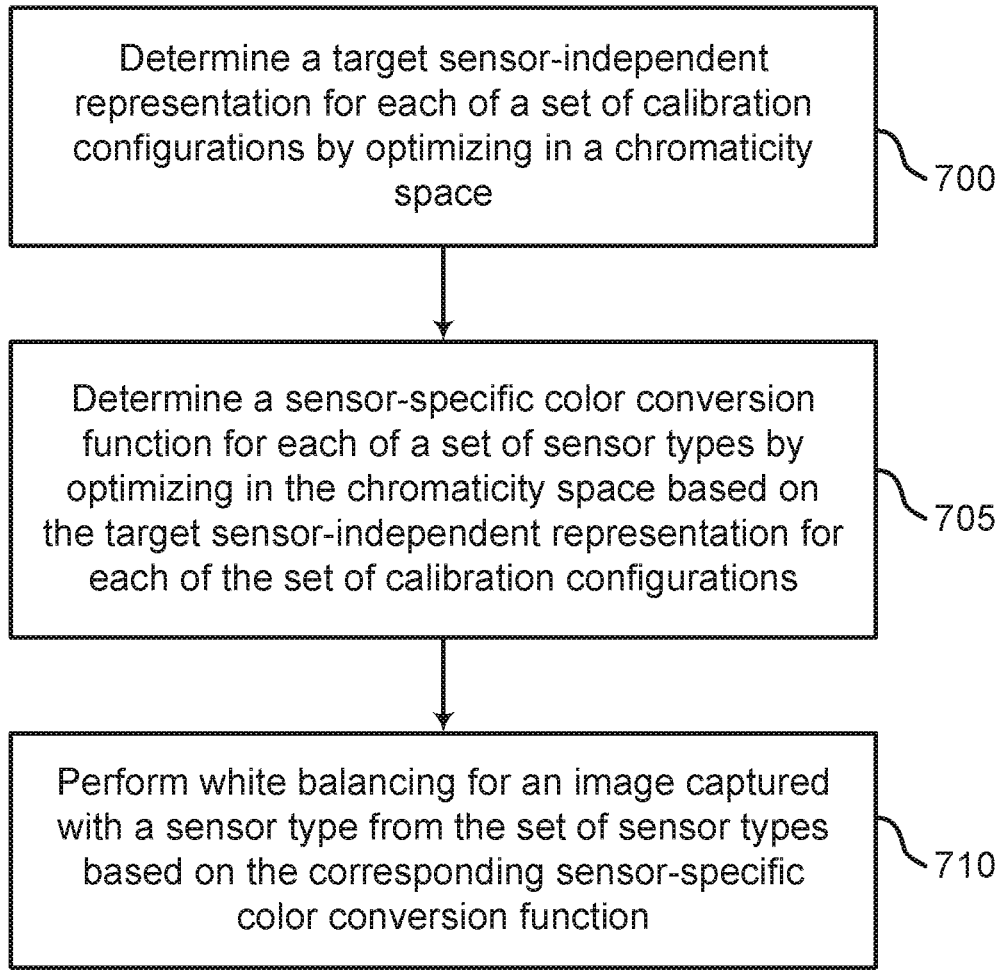

FIG. 7 shows an example of a process for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system determines a target sensor-independent representation for each of a set of calibration configurations by optimizing in a chromaticity space. In some cases, the operations of this step refer to, or may be performed by, a calibration component as described with reference to FIG. 1.

At operation 705, the system determines a sensor-specific color conversion function for each of a set of sensor types by optimizing in the chromaticity space based on the target sensor-independent representation for each of the set of calibration configurations. In some cases, the operations of this step refer to, or may be performed by, a color correction component as described with reference to FIG. 1. In some cases, operation 700 and operation 705 may be performed offline.

At operation 710, the system performs white balancing for an image captured with a sensor type from the set of sensor types based on the corresponding sensor-specific color conversion function. In some cases, the operations of this step refer to, or may be performed by, a color correction component as described with reference to FIG. 1. In some cases, operation 710 may be performed online.

Figure 8:
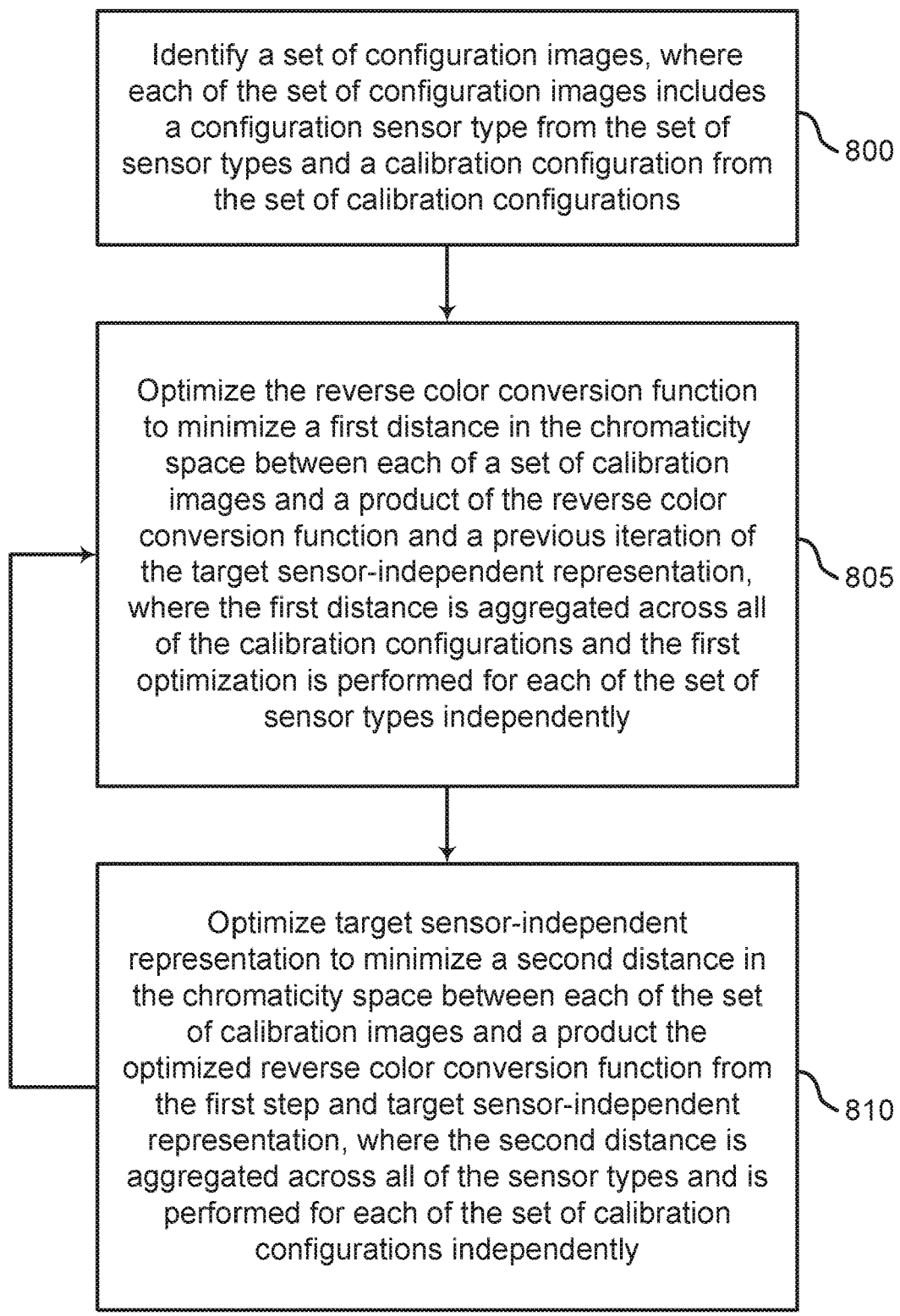

FIG. 8 shows an example of a process for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies a set of configuration images, where each of the set of configuration images includes a configuration sensor type from the set of sensor types and a calibration configuration from the set of calibration configurations. In some cases, the operations of this step refer to, or may be performed by, a calibration component as described with reference to FIG. 1.

Upon identification of the set of configuration images (e.g., at operation 800), the system may iterated between operations 805 and 810 to produce a reverse color conversion matrix for each of the plurality of sensor types and a target sensor-independent representation for each of the plurality of calibration configurations.

At operation 805, the system optimizes the reverse color conversion function to minimize a first distance in the chromaticity space between each of a set of calibration images and a product of the reverse color conversion function and a previous iteration of the target sensor-independent representation, where the first distance is aggregated across all of the calibration configurations and the first optimization is performed for each of the set of sensor types independently. In some cases, the operations of this step refer to, or may be performed by, a calibration component as described with reference to FIG. 1.

At operation 810, the system optimizes target sensor-independent representation to minimize a second distance in the chromaticity space between each of the set of calibration images and a product the optimized reverse color conversion function from the first step and target sensor-independent representation, where the second distance is aggregated across all of the plurality of sensor types and is performed for each of the set of calibration configurations independently.

The system may then iterate between operations 805 and 810 until a reverse color conversion matrix for each of the plurality of sensor types and a target sensor-independent representation for each of the plurality of calibration configurations is produced.

Figure 9:
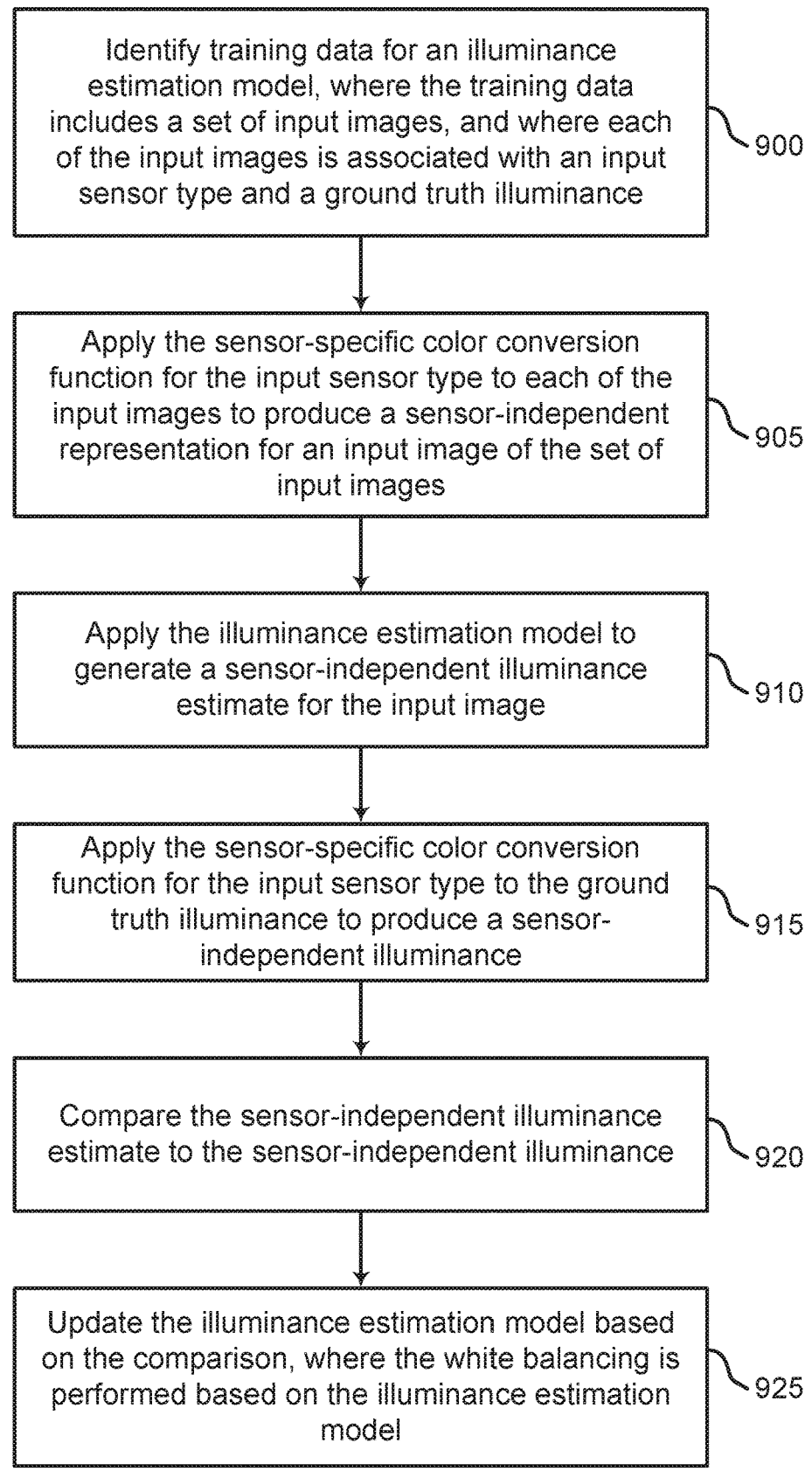

FIG. 9 shows an example of a process for image processing according to aspects of the present disclosure. In some examples, these operations are performed by a system including a processor executing a set of codes to control functional elements of an apparatus. Additionally alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies training data for an illuminance estimation model, where the training data includes a set of input images, and where each of the input images is associated with an input sensor type and a ground truth illuminance. In some cases, the operations of this step refer to, or may be performed by, a training component as described with reference to FIG. 1.

At operation 905, the system applies the sensor-specific color conversion function for the input sensor type to each of the input images to produce a sensor-independent representation for an input image of the set of input images. In some cases, the operations of this step refer to, or may be performed by, a pre-processing component as described with reference to FIGS. 1-3.

At operation 910, the system applies the illuminance estimation model to generate a sensor-independent illuminance estimate for the input image. In some cases, the operations of this step refer to, or may be performed by, an illuminance estimation component as described with reference to FIGS. 1-3.

At operation 915, the system applies the sensor-specific color conversion function for the input sensor type to the ground truth illuminance to produce a sensor-independent illuminance. In some cases, the operations of this step refer to, or may be performed by, a pre-processing component as described with reference to FIGS. 1-3.

At operation 920, the system compares the sensor-independent illuminance estimate to the sensor-independent illuminance. In some cases, the operations of this step refer to, or may be performed by, a training component as described with reference to FIG. 1.

At operation 925, the system updates the illuminance estimation model based on the comparison, where the white balancing is performed based on the illuminance estimation model. In some cases, the operations of this step refer to, or may be performed by, a training component as described with reference to FIG. 1.

Accordingly, the present disclosure includes the following embodiments.

A method for image processing is described. Embodiments of the method are configured to identifying image data for an image, wherein the image data comprises a sensor type, generating a sensor-independent representation of the image using a sensor-specific color conversion function corresponding to the sensor type, wherein parameters of the sensor-specific color conversion function have been optimized in a chromaticity space, and producing a sensor-independent illuminance estimate for the image based on the sensor-independent representation.

An apparatus for image processing is described. The apparatus includes a processor, memory in electronic communication with the processor, and instructions stored in the memory. The instructions are operable to cause the processor to identify image data for an image, wherein the image data comprises a sensor type, generate a sensor-independent representation of the image using a sensor-specific color conversion function corresponding to the sensor type, wherein parameters of the sensor-specific color conversion function have been optimized in a chromaticity space, and produce a sensor-independent illuminance estimate for the image based on the sensor-independent representation.

A non-transitory computer readable medium storing code for image processing is described. In some examples, the code comprises instructions executable by a processor to: identify image data for an image, wherein the image data comprises a sensor type, generate a sensor-independent representation of the image using a sensor-specific color conversion function corresponding to the sensor type, wherein parameters of the sensor-specific color conversion function have been optimized in a chromaticity space, and produce a sensor-independent illuminance estimate for the image based on the sensor-independent representation.

A system for image processing is described. Embodiments of the system are configured to identifying image data for an image, wherein the image data comprises a sensor type, generating a sensor-independent representation of the image using a sensor-specific color conversion function corresponding to the sensor type, wherein parameters of the sensor-specific color conversion function have been optimized in a chromaticity space, and producing a sensor-independent illuminance estimate for the image based on the sensor-independent representation.

Some examples of the method, apparatus, non-transitory computer readable medium, and system described above further include capturing the image using a sensor corresponding to the sensor type. Some examples of the method, apparatus, non-transitory computer readable medium, and system described above further include determining a spectral sensitivity of the sensor. Some examples further include determining the sensor type based on the spectral sensitivity.

Some examples of the method, apparatus, non-transitory computer readable medium, and system described above further include applying an inverse of the sensor-specific color conversion function to the sensor-independent illuminance estimate to produce a sensor-specific illuminance estimate. Some examples further include performing color correction on the image based on the sensor-specific illuminance estimate. Some examples of the method, apparatus, non-transitory computer readable medium, and system described above further include displaying a white-balanced version of the image to a user based on the color correction.

Some examples of the method, apparatus, non-transitory computer readable medium, and system described above further include determining a target sensor-independent representation for each of a plurality of calibration configurations by optimizing in the chromaticity space. Some examples further include determining the sensor-specific color conversion function for the sensor type based on the target sensor-independent representation for each of the plurality of calibration configurations. In some examples, the image data comprises a 3-channel image vector, and the sensor-specific color conversion function comprises a 3×3 matrix.

A method for image processing is described. Embodiments of the method are configured to determining a target sensor-independent representation for each of a plurality of calibration configurations by optimizing in a chromaticity space, determining a sensor-specific color conversion function for each of a plurality of sensor types by optimizing in the chromaticity space based on the target sensor-independent representation for each of the plurality of calibration configurations, and performing white balancing for an image captured with a sensor type from the plurality of sensor types based on the corresponding sensor-specific color conversion function.

An apparatus for image processing is described. The apparatus includes a processor, memory in electronic communication with the processor, and instructions stored in the memory. The instructions are operable to cause the processor to determine a target sensor-independent representation for each of a plurality of calibration configurations by optimizing in a chromaticity space, determine a sensor-specific color conversion function for each of a plurality of sensor types by optimizing in the chromaticity space based on the target sensor-independent representation for each of the plurality of calibration configurations, and perform white balancing for an image captured with a sensor type from the plurality of sensor types based on the corresponding sensor-specific color conversion function.

A non-transitory computer readable medium storing code for image processing is described. In some examples, the code comprises instructions executable by a processor to: determine a target sensor-independent representation for each of a plurality of calibration configurations by optimizing in a chromaticity space, determine a sensor-specific color conversion function for each of a plurality of sensor types by optimizing in the chromaticity space based on the target sensor-independent representation for each of the plurality of calibration configurations, and perform white balancing for an image captured with a sensor type from the plurality of sensor types based on the corresponding sensor-specific color conversion function.

A system for image processing is described. Embodiments of the system are configured to determining a target sensor-independent representation for each of a plurality of calibration configurations by optimizing in a chromaticity space, determining a sensor-specific color conversion function for each of a plurality of sensor types by optimizing in the chromaticity space based on the target sensor-independent representation for each of the plurality of calibration configurations, and performing white balancing for an image captured with a sensor type from the plurality of sensor types based on the corresponding sensor-specific color conversion function.

Some examples of the method, apparatus, non-transitory computer readable medium, and system described above further include identifying a plurality of configuration images, wherein each of the plurality of configuration images comprises a configuration sensor type from the plurality of sensor types and a calibration configuration from the plurality of calibration configurations. Some examples further include iterating between a first step and a second step to produce a reverse color conversion function for each of the plurality of sensor types and a target sensor-independent representation for each of the plurality of calibration configurations, wherein the first step optimizes the reverse color conversion function to minimize a first distance in the chromaticity space between each of a plurality of calibration images and a product of the reverse color conversion function and a previous iteration of the target sensor-independent representation, wherein the first distance is aggregated across all of the calibration configurations and the first optimization is performed for each of the plurality of sensor types independently; and wherein the second step optimizes target sensor-independent representation to minimize a second distance in the chromaticity space between each of the plurality of calibration images and a product the optimized reverse color conversion function from the first step and target sensor-independent representation, wherein the second distance is aggregated across all of the sensor types and is performed for each of the plurality of calibration configurations independently.

Some examples of the method, apparatus, non-transitory computer readable medium, and system described above further include initializing the target sensor-independent representation for each of the plurality of calibration configurations based on a reference illuminance.

Some examples of the method, apparatus, non-transitory computer readable medium, and system described above further include minimizing a distance between a chromaticity-space representation of a product of a color conversion function and a plurality of calibration images corresponding to a corresponding sensor type and the plurality of calibration configurations to a chromaticity space representation of each of the plurality of calibration configurations, wherein the target sensor-independent representation for each of the plurality of calibration configurations is based on the minimizing.

In some examples, each of the plurality of calibration configurations comprises a reflectance and an illuminance. In some examples, the plurality of calibration configurations represents an evenly spaced covering of a color space. Some examples of the method, apparatus, non-transitory computer readable medium, and system described above further include identifying image data comprising a 3-channel image vector, wherein each of the sensor-specific color conversion functions comprises a 3×3 matrix.

Some examples of the method, apparatus, non-transitory computer readable medium, and system described above further include performing pre-processing ori the image using the sensor-specific color conversion function to produce a sensor-independent representation of the image. Some examples further include generating a sensor-independent illuminance estimate based on the sensor-independent representation of the image. Some examples further include performing post-processing on the sensor-independent illuminance estimate using an inverse of the sensor-specific color conversion function, wherein the white balancing is performed based on the post-processing.

Some examples of the method, apparatus, non-transitory computer readable medium, and system described above further include identifying training data for an illuminance estimation model, wherein the training data comprises a plurality of input images, and wherein each of the input images is associated with an input sensor type and a ground truth illuminance. Some examples further include applying the sensor-specific color conversion function for the input sensor type to each of the input images to produce a sensor-independent representation for an input image of the plurality of input images. Some examples further include applying the illuminance estimation model to generate a sensor-independent illuminance estimate for the input image. Some examples further include applying the sensor-specific color conversion function for the input sensor type to the ground truth illuminance to produce a sensor-independent illuminance. Some examples further include comparing the sensor-independent illuminance estimate to the sensor-independent illuminance. Some examples further include updating the illuminance estimation model based on the comparison, wherein the white balancing is performed based on the illuminance estimation model.

An apparatus for image processing is described. Embodiments of the apparatus are configured to a sensor configured to capture image data, wherein the sensor has a spectral sensitivity corresponding to a sensor type, a pre-processing component configured to generate a sensor-independent representation of the image using a sensor-specific color conversion function corresponding to the sensor type, wherein parameters of the sensor-specific color conversion function have been optimized in a chromaticity space, an illuminance estimation component configured to produce a sensor-independent illuminance estimate based on the sensor-independent representation, and a post-processing component configured to generate a sensor-specific illuminance estimate based on the sensor-independent illuminance estimate using an inverse of the sensor-specific color conversion function.

A system for image processing is described. The system includes a sensor configured to capture image data, wherein the sensor has a spectral sensitivity corresponding to a sensor type, a pre-processing component configured to generate a sensor-independent representation of the image using a sensor-specific color conversion function corresponding to the sensor type, wherein parameters of the sensor-specific color conversion function have been optimized in a chromaticity space, an illuminance estimation component configured to produce a sensor-independent illuminance estimate based on the sensor-independent representation, and a post-processing component configured to generate a sensor-specific illuminance estimate based on the sensor-independent illuminance estimate using an inverse of the sensor-specific color conversion function.

Some examples of the apparatus, system, and method described above further include a color correction component configured to perform color correction on the image based on the sensor-specific illuminance estimate. Some examples of the apparatus, system, and method described above further include a display configured to display the image to a user based on the color correction. Some examples of the apparatus, system, and method described above further include a calibration component configured to optimize the parameters of the sensor-specific color conversion function in the chromaticity space.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components Wray be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ, Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   identifying a plurality of sensor types, wherein each of the plurality of sensor types corresponds to a spectral sensitivity;
   determining a target sensor-independent representation for each of a plurality of calibration configurations by optimizing in a chromaticity space;
   determining a sensor-specific color conversion function for each of the plurality of sensor types by optimizing in the chromaticity space based on the target sensor-independent representation for the plurality of calibration configurations;
   selecting the sensor-specific color conversion function corresponding to a sensor type of a camera device; and
   calibrating an illuminant estimation function of the camera device by transmitting the selected sensor-specific color conversion function to the camera device.

2. The method of claim 1, further comprising:
   identifying a plurality of configuration images, wherein each of the plurality of configuration images comprises a configuration sensor type from the plurality of sensor types and a calibration configuration from the plurality of calibration configurations; and
   iterating between a first step and a second step to produce a reverse color conversion function for each of the plurality of sensor types and a target sensor-independent representation for each of the plurality of calibration configurations,
   wherein the first step optimizes the reverse color conversion function to minimize a first distance in the chromaticity space between each of a plurality of calibration images and a product of the reverse color conversion function and a previous iteration of the target sensor-independent representation, wherein the first distance is aggregated across all of the calibration configurations and the optimization of the first step is performed for each of the plurality of sensor types independently; and
   wherein the second step optimizes the target sensor-independent representation to minimize a second distance in the chromaticity space between each of the plurality of calibration images and a product of the optimized reverse color conversion function from the first step and target sensor-independent representation, wherein the second distance is aggregated across all of the plurality of sensor types and the optimization of the second step is performed for each of the plurality of calibration configurations independently.

3. The method of claim 2, further comprising:
initializing the target sensor-independent representation for each of the plurality of calibration configurations based on a reference illuminance.

4. The method of claim 1, further comprising:
minimizing a distance between a chromaticity-space representation of a product of a color conversion function and a plurality of calibration images corresponding to a corresponding sensor type and the plurality of calibration configurations to a chromaticity space representation of target sensor-independent representation of the plurality of calibration configurations.

5. The method of claim 1, wherein:
each of the plurality of calibration configurations comprises a reflectance and an illuminance.

6. The method of claim 1, wherein:
the plurality of calibration configurations are distributed throughout a color space.

7. The method of claim 1, further comprising:
identifying image data comprising a 3-channel image vector, wherein each of the sensor-specific color conversion functions comprises a 3×3 matrix.

8. The method of claim 1, wherein the illuminant estimation function comprises:
capturing a raw image using the camera device;
producing a sensor-independent illuminance estimate for the raw image;
applying an inverse of the sensor-specific color conversion function to the sensor-independent illuminance estimate to produce a sensor-specific illuminance estimate; and
performing white balancing for the raw image based on the sensor-specific illuminance estimate to obtain a white-balanced image.

9. The method of claim 8, wherein the illuminant estimation function further comprises:
performing pre-processing on the raw image using the sensor-specific color conversion function to produce a sensor-independent representation of the raw image;
generating a sensor-independent illuminance estimate based on the sensor-independent representation of the raw image; and
performing post-processing on the sensor-independent illuminance estimate using an inverse of the sensor-specific color conversion function, wherein the white balancing is performed based on the post-processing.

10. The method of claim 1, further comprising:
identifying training data for an illuminance estimation model, wherein the training data comprises a plurality of input images, and wherein each of the input images is associated with an input sensor type and a ground truth illuminance;
applying the sensor-specific color conversion function for the input sensor type to each of the input images to produce a sensor-independent representation for an input image of the plurality of input images;
applying the illuminance estimation model to generate a sensor-independent illuminance estimate for the input image;
applying the sensor-specific color conversion function for the input sensor type to the ground truth illuminance to produce a sensor-independent illuminance;

comparing the sensor-independent illuminance estimate to the sensor-independent illuminance; and
updating the illuminance estimation model based on the comparison, wherein the white balancing is performed based on the illuminance estimation model.

11. The method of claim 1, wherein the image comprises a 3-channel image vector, and the sensor-specific color conversion function comprises a 3×3 matrix.

12. An apparatus comprising:
a sensor configured to capture an image, wherein the sensor has a spectral sensitivity corresponding to a sensor type;
a processor; and
a memory storing instructions executable by the processor to cause the apparatus to:
generate a sensor-independent representation of the image using a sensor-specific color conversion function corresponding to the sensor type, wherein the sensor-specific color conversion function is determined based on the sensor type prior to capturing the image and is stored in the memory during a configuration of the apparatus;
produce a sensor-independent illuminance estimate for the image based on the sensor-independent representation;
apply an inverse of the sensor-specific color conversion function to the sensor-independent illuminance estimate to produce a sensor-specific illuminance estimate; and
perform white balancing for the image based on the sensor-specific illuminance estimate.

13. The apparatus of claim 12, wherein the sensor-specific color conversion function is generated by a process including:
identifying a plurality of sensor types, wherein each of the plurality of sensor types corresponds to a spectral sensitivity;
determining a target sensor-independent representation for each of a plurality of calibration configurations by optimizing in a chromaticity space;
determining the sensor-specific color conversion function for each of the plurality of sensor types by optimizing in the chromaticity space based on the target sensor-independent representation for each of the plurality of calibration configurations.

14. The apparatus of claim 13, wherein the process further includes:
identifying a plurality of configuration images, wherein each of the plurality of configuration images comprises a configuration sensor type from a plurality of sensor types and a calibration configuration from a plurality of calibration configurations; and
iterating between a first step and a second step to produce a reverse color conversion function for each of the plurality of sensor types and a target sensor-independent representation for each of the plurality of calibration configurations,
wherein the first step optimizes the reverse color conversion function to minimize a first distance in a chromaticity space between each of a plurality of calibration images and a product of the reverse color conversion function and a previous iteration of the target sensor-independent representation, wherein the first distance is aggregated across all of the calibration configurations and the optimization of the first step is performed for each of the plurality of sensor types independently; and wherein the second step optimizes the target sensor-independent representation to minimize a second distance in the chromaticity space between each of the plurality of calibration images and a product the optimized reverse color conversion function from the first step and target sensor-independent representation, wherein the second distance is aggregated across all of the plurality of sensor types and the optimization of the second step is performed for each of the plurality of calibration configurations independently.

15. The apparatus of claim 13, wherein the process further includes:
  initializing the target sensor-independent representation for each of the plurality of calibration configurations based on a reference illuminance.

16. The apparatus of claim 13, wherein the process further includes:
  minimizing a distance between a chromaticity-space representation of a product of a color conversion function and a plurality of calibration images corresponding to a corresponding sensor type and the plurality of calibration configurations to a chromaticity space representation of each of the plurality of calibration configurations, wherein a target sensor-independent representation for each of a plurality of calibration configurations is based on the minimizing.

17. The apparatus of claim 15, wherein:
  the plurality of calibration configurations represents an evenly spaced covering of a color space.

18. The apparatus of claim 12, wherein the sensor-specific color conversion function is generated by a process including:
  identifying image data comprising a 3-channel image vector, wherein the sensor-specific color conversion function comprises a 3×3 matrix.

19. An apparatus comprising:
  a sensor configured to capture an image, wherein the sensor has a spectral sensitivity corresponding to a sensor type;
  a processor; and
  a memory storing instructions executable by the processor to cause the apparatus to:
    perform pre-processing on the image based on a sensor-specific color conversion function to produce a sensor-independent representation of the image by generating the sensor-independent representation of the image using the sensor-specific color conversion function corresponding to the sensor type, wherein the sensor-specific color conversion function is stored in the memory during a configuration of the apparatus;
    produce a sensor-independent illuminance estimate for the image based on the sensor-independent representation;
    perform post-processing on the sensor-independent illuminance estimate based on the inverse of the sensor-specific color conversion function by applying the inverse of the sensor-specific color conversion function to the sensor-independent illuminance estimate to produce a sensor-specific illuminance estimate; and
    perform white balancing for the image based on the sensor-specific illuminance estimate.

20. The apparatus of claim 12, wherein the sensor-specific color conversion function is generated by a process including:
  identifying training data for an illuminance estimation model, wherein the training data comprises a plurality of input images, and wherein each of the input images is associated with an input sensor type and a ground truth illuminance;
  applying the sensor-specific color conversion function for the input sensor type to each of the input images to produce a sensor-independent representation for an input image of the plurality of input images;
  applying the illuminance estimation model to generate a sensor-independent illuminance estimate for the input image;
  applying the sensor-specific color conversion function for the input sensor type to the ground truth illuminance to produce a sensor-independent illuminance;
  comparing the sensor-independent illuminance estimate to the sensor-independent illuminance; and
  updating the illuminance estimation model based on the comparison, wherein the white balancing is performed based on the illuminance estimation model.

* * * * *